Patented Oct. 13, 1925.

1,557,154

UNITED STATES PATENT OFFICE.

ANTHONY GEORGE, OF NIAGARA FALLS, NEW YORK, ASSIGNOR TO THE MATHIESON ALKALI WORKS, INC., OF NEW YORK, N. Y., A CORPORATION OF VIRGINIA.

MANUFACTURE OF BENZOYL CHLORIDE.

No Drawing.    Application filed July 22, 1924. Serial No. 727,413.

*To all whom it may concern:*

Be it known that I, ANTHONY GEORGE, a citizen of Greece (who has declared his intention of becoming a citizen of the United States), residing at Niagara Falls, in the county of Niagara, State of New York, have invented certain new and useful Improvements in the Manufacture of Benzoyl Chloride; and I do hereby declare the following to be a full, clear, and exact description of the invention, such as will enable others skilled in the art to which it appertains to make and use the same.

This invention relates to an improved process for the manufacture of benzoyl chloride.

The usual methods for the preparation of benzoyl chloride involve the use of benzoic acid, or its salts, and some compound of sulfur and chlorin. It has also been proposed to prepare benzoyl chloride by heating benzoic acid with zinc chloride and adding benzotrichloride.

According to the present invention, benzoyl chloride is produced directly from benzotrichloride, in a simple and advantageous manner by the addition of water in regulated amounts to benzotrichloride in which is suspended a small amount of a catalyst, particularly anhydrous zinc chloride. I have found that it is possible to go directly from benzotrichloride to benzoyl chloride simply by the addition of water in the sense of the following equation:—

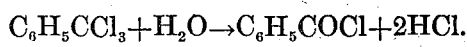
$$C_6H_5CCl_3 + H_2O \rightarrow C_6H_5COCl + 2HCl.$$

In the process of the present invention, the benzotrichloride with a small amount of anhydrous zinc chloride suspended therein is treated with a slight excess of the theoretical amount of water indicated by the above equation. The hydrochloric acid is given off in gaseous form and the benzoyl chloride and the insoluble zinc chloride remaining are separated by filtration or decantation. The crude benzoyl chloride can then be recovered by distillation in vacuo, yielding thereby a very pure product.

I have found that zinc chloride is a particularly advantageous catalyst in the present process, but the present invention is not limited to its use. Zinc benzoate, zinc sulfate, zinc oxide, or zinc oxychloride may also be used.

With sufficiently effective agitation it is possible to obtain rapid reaction when the anhydrous catalyst is added directly as a finely divided powder. Where agitation is not effective, however, it is advantageous to use a carrier for the catalyst, for example, by impregnating pumice, charcoal, asbestos or other inert material which will float on the reaction mixture with the catalyst and adding the impregnating material to the benzotrichloride. By using such an inert carrier, the catalyst is easily brought to the surface of the benzotrichloride and reaction starts as soon as water is added.

It is important for the successful operation of the process that the water be added at a regulated rate, not in excess of that at which it will react. If excess water accumulates in the reactor, it will dissolve the catalyst and thereby retard or inhibit the reaction. The catalyst should remain in the solid or semi-solid state throughout the reaction. It is also important that the agitation be sufficient to disperse the water and maintain the catalyst or inert material containing the catalyst in suspension.

The amount of water which is added is regulated and any large excess of water is avoided. The addition of an excess of water will cause further reaction and the formation of benzoic acid. Some benzoic acid may incidentally be formed during the hydrolysis of the benzotrichloride to form benzoyl chloride, but so long as any benzotrichloride remains it will react with such incidental amounts of benzoic acid as may be formed and give benzoyl chloride.

This reaction prevents the formation of appreciable amounts of benzoic acid so long as any benzotrichloride remains. If, however, further additions of water are made after the benzotrichloride has all been converted into benzoyl chloride, formation of benzoic acid will take place; but such formation in any considerable amount is not desired in the present process, and the amount of water added is so regulated that substantially the maximum yield of benzoyl chloride will be obtained.

The proper amount of water to be added is dependent upon the benzotrichloride content of the chlorinated toluene used. Benzotrichloride is commonly produced by the chlorination of toluene, and, depending upon the method of chlorination, varying contents of the benzotrichloride may be contained in the chlorinated product. If the toluene has been chlorinated in the light at a temperature of 100 to 150° C. and has a specific gravity of 1.375 to 1.385, it may, for purposes of calculating the proper amount of water to use, be assumed to contain from 85 to 90% of benzotrichloride. It has been found advantageous to use about 5 to 10% above the theoretical amount of water in order to insure a high quality product. If more water is used, the quality of the product may be improved, but the yield will be somewhat reduced due to the formation of benzoic acid. If too little water is used the yield will be increased but unconverted chlorinated products will usually be obtained in the product. With chlorinated toluene of the character referred to above, and using from 5 to 10% excess water, yields of as high as 75 to 85% or higher can be obtained of vacuum distilled benzoyl chloride melting at −1 to −2° C. After the benzoyl chloride has been removed from the residue by vacuum distillation, the residue contains some benzoic acid and some benzoyl chloride. This residue may be treated for the recovery of the benzoic acid and benzoyl chloride by suitable methods, as for instance, by digesting the residue with milk of lime, steam distilling the small amount of benzaldehyde and oils that may be present, and filtering off the solution of calcium benzoate. Pure benzoic acid can be obtained from the solution by acidification, filtration and washing.

The invention will be further illustrated by the following specific description but it will be understood that the invention is not limited thereto:

750 lbs. of chlorinated toluene, chlorinated, for example, as above described, and of specific gravity 1.38 at 20° C. are placed in a 100 gal. stoneware vessel provided with an agitator and capable of being heated. A reflux condenser is not required. With the agitator in operation, the temperature is raised to about 100° C. and pumice impregnated with zinc chloride is added in such amount that about 5 lbs. of zinc chloride are introduced.

Water is then run in slowly at a rate not in excess of that at which it will react, and the addition of water is continued until about 61 to 64 lbs. of water have been added. The water is preferably run in slowly through a glass tube extending underneath the surface of the liquor. Hydrochloric acid gas is evolved immediately at a rate directly dependent upon the rate at which the water is added. The acid evolved contains only traces of organic impurities, and may be absorbed in water according to any of the well-known methods. The temperature is maintained at 100 to 110° C. throughout the reaction.

After 61 to 64 lbs. of water have been added the reaction mass is digested at about 100–120° C. for half an hour with continued agitation. The reaction may then be considered complete.

The contents of the reactor are then drawn off, filtered in an acid proof filter to remove the zinc chloride, and introduced into a stoneware vacuum still, and the product subjected to vacuum distillation, for example, by carrying out the vacuum distillation at 110 to 120° C. under about 45 mm. pressure. A yield of about 75 to 85% or more of benzoyl chloride is obtained, which in the case of the particular example under consideration amounts to around 370 lbs.

The residue remaining in the still after the vacuum distillation is then digested with milk of lime and treated for the recovery of pure benzoic acid, for example, by steam distilling the small amount of benzaldehyde and oils that may be present, and filtering off the solution of calcium benzoate, and recovering the benzoic acid from the calcium benzoate by acidification, filtration and washing.

The zinc chloride and pumice filtered off at the end of the hydrolysis may be employed again if desired as catalyst in the further carrying out of the process.

There may be some reduction in yield due to charring during the vacuum distillation of the benzoyl chloride, but this is usually not more than a few percent at most. High temperatures during distillation, however, increase the amount lost in this manner.

The benzoyl chloride produced in accordance with the above example melts at −1 to −2° C., has a specific gravity of about 1.213 at $\frac{20}{4}$, and contains around 24.8 to 26.0% of chlorine, thus indicating a product of high purity.

It will thus be seen that the process of the invention provides an improved method for the manufacture of benzoyl chloride directly from benzotrichloride, in which the benzotrichloride is subjected to a partial and regulated hydrolysis with water in the presence of a catalyst, particularly zinc chloride, and that the benzoyl chloride can be readily obtained in a state of high purity from the reaction product.

I claim:

1. The method of producing benzoyl chloride, which comprises adding water gradually to an agitated mixture of benzotrichloride containing a catalyst in suspension and maintained at a temperature at which active hydrolysis of the benzotrichloride takes place, the amount of water added not substantially exceeding about 110% of that theoretically required to form benzoyl chloride, the catalyst containing as an active agent only an anhydrous zinc salt.

2. The method of producing benzoyl chloride, which comprises adding water gradually to an agitated mixture of benzotrichloride containing a catalyst in suspension and maintained at a temperature at which active hydrolysis of the benzotrichloride takes place, the amount of water added not substantially exceeding about 110% of that theoretically required to form benzoyl chloride, the catalyst containing as an active agent only an anhydrous zinc salt, and continuing the digestion of the mixture for a further period of time after the addition of the water has been completed.

3. The method of producing benzoyl chloride, which comprises adding water gradually to an agitated mixture of benzotrichloride containing a catalyst in suspension and maintained at a temperature of about 100° to 120° C., the amount of water added not substantially exceeding about 110% of that theoretically required to form benzoyl chloride, the catalyst containing as an active agent only anhydrous zinc chloride.

4. The method of producing benzoyl chloride, which comprises adding water gradually to an agitated mixture of benzotrichloride containing a catalyst in suspension and maintained at a temperature of about 100° to 120° C., the amount of water added not substantially exceeding about 110% of that theoretically required to form benzoyl chloride, the catalyst containing as an active agent only anhydrous zinc chloride, the water being added at a rate not substantially in excess of the rate at which it will react.

5. The method of producing benzoyl chloride, which comprises adding water gradually to an agitated mixture of benzotrichloride containing an anhydrous zinc salt in suspension and maintained at a temperature at which active hydrolysis of the benzotrichloride takes place, the amount of water added not substantially exceeding about 110% of that theoretically required to form benzoyl chloride, the anhydrous zinc salt being carried by an inert carrier which will float on the reaction mixture.

In testimony whereof I affix my signature.

ANTHONY GEORGE.